United States Patent [19]

Paterniti

[11] 3,847,669

[45] Nov. 12, 1974

[54] REDUCED MERCURY CONTAINING ZINC ALKALINE CELLS

[75] Inventor: Sam C. Paterniti, Lakewood, Ohio

[73] Assignee: Union Carbide Corporation, New York, N.Y.

[22] Filed: Aug. 3, 1973

[21] Appl. No.: 385,309

Related U.S. Application Data

[63] Continuation of Ser. No. 185,864, Oct. 1, 1971, abandoned.

[52] U.S. Cl. .................................. 136/30, 136/107
[51] Int. Cl. ........................................ H01m 41/00
[58] Field of Search...... 136/30, 102, 107, 125–130, 136/153, 154

[56] References Cited

UNITED STATES PATENTS

| | | | |
|---|---|---|---|
| 3,653,965 | 4/1972 | Loe | 136/30 |
| 2,900,434 | 8/1959 | Zimmerman et al. | 136/107 X |
| 2,993,947 | 7/1961 | Leger | 136/107 |

*Primary Examiner*—Helen M. McCarthy
*Assistant Examiner*—C. F. Le Fevour
*Attorney, Agent, or Firm*—Cornelius F. O'Brien

[57] ABSTRACT

The proportion of mercury needed in alkaline zinc-manganese dioxide cells to provide adequate shelf life is reduced by incorporating in such cells an ethylene oxide polymer.

7 Claims, No Drawings

[3,847,669]

REDUCED MERCURY CONTAINING ZINC ALKALINE CELLS

This is a continuation of application Ser. No. 185,864 filed October 1, 1971 now abandoned.

The invention relates to alkaline zinc-manganese dioxide electrochemical cells containing an ethylene oxide polymer as a means for reducing the proportion of mercury needed to provide adequate shelf life.

Alkaline electrochemical cells having a zinc anode and a manganese dioxide cathode have in recent years become commerically important as a relatively high rate source of electrical energy. The alkaline electrolyte, which is conventionally concentrated aqueous potassium hydroxide, is a principal factor contributing to the ability of these cells to deliver high rates of electrical energy compared to the older Leclanche cells which utilize zinc chloride and ammonium chloride electrolytes. However, as is so often the case with technological advances, the presence of alkali in an electrochemical cell is not an unmixed blessing. For instance, alkali, a very reactive substance, reacts with zinc. Unless means are employed to control this reaction, the shelf life of alkaline zinc cells would be unacceptably short. In addition, since hydrogen gas is released in the reaction between alkali and zinc, there would be a danger of cell explosion unless a fail-safe means for venting the hydrogen is provided.

In commercial alkaline zinc cells today, the reaction between zinc and alkali is controlled or reduced to an acceptable rate by the addition of mercury to the cell. Unfortunately, it has recently become apparent that the introduction of waste mercury into the environment may be a hazard to human health as well as to other forms of life. While individual cells contain only a small amount of mercury, the very large number of zinc alkaline cells marketed today could cause significant quantities of mercury to enter the environment after disposal of such cells. The present invention provides a means for reducing the proportion of mercury needed in alkaline zinc cells to reduce the rate of reaction between alkali and zinc in order to achieve acceptable storage life.

Accordingly, it is an object of this invention to provide a means for reducing the amount of mercury that is used in alkaline zinc-manganese dioxide electrochemical cells to achieve acceptable storage life.

This and other objects and advantages of the invention will be apparent from the following description.

Briefly, the invention resides in the discovery that the proportion of mercury needed in alkaline zinc-manganese dioxide cells to achieve acceptable storage life can be reduced by the addition of small amounts of an ethylene oxide polymer [1] to the cell.

[1] The use of ethylene oxide polymers in rechargeable galvanic cells having a zinc anode and a zinc-containing electrolyte to suppress zinc dendrite formation during charging is disclosed and claimed in copending application Ser. No. 081,521 now U.S. Pat. No. 3,653,965, filed Oct. 16, 1970 in the name of T. S. Lee, and assigned to the same assignee as this application.

The materials that are employed in the cell to reduce the level of mercury needed to provide adequate shelf life are the ethylene oxide polymers and their derivatives. Such polymers are known in the art and those that are contemplated for use in this invention are di- and triethylene glycol, the polyethylene glycols having an average molecular weight range of about 190 to about 7,000, and their mono- and diethers and esters. The ethers and esters of polyethylene glycols employed are illustrated by the $C_4$ and lower alkyl ethers and $C_4$ and lower alkanoate esters. Suitable ether derivatives include, for example, methoxy diethylene glycol and the methoxy or ethoxy polyethylene glycols. Suitable ester derivatives include polyethylene glycol acetate.

The preferred ethylene oxide polymers are the polyethylene glycols and methoxy polyethylene glycols having molecular weights averaging from about 300 to about 700.

The ethylene oxide additives can be used singly or in combination. They are generally soluble in water, and can be added as a water solution to the cell. For example, the additive can be included in the water that is employed to pre-wet the separator in order to facilitate the wetting of the separator by the electrolyte. The additive then migrates to the zinc surface as the cell comes to equilibrium. Alternatively, the ethylene oxide polymer can be added directly to the zinc during the production of the anode gel.

The ethylene oxide polymer is employed in the cell in an amount sufficient to reduce the rate of reaction between the zinc and the alkaline electrolyte, thereby permitting a significant reduction in the proportion of mercury needed to achieve satisfactory shelf life. While it would be desirable to eliminate mercury completely from the cell, thus far this invention has not been successful in achieving this object. In any event, however, the invention provides a means for eliminating some of the ecologically objectionable mercury from the cells and replacing it with ecologically innocuous materials.

In general, beneficial effects are obtained with proportions of ethylene oxide polymer in excess of about 0.01 weight per cent, and preferably in excess of about 0.1 weight per cent, percentage being based upon weight of zinc. Much larger proportions than these can be employed, for instance, proportions as large as 12 weight per cent of ethylene oxide polymer have been employed in laboratory tests and the beneficial effects were still obtained. However, no increase in the beneficial effects of the ethylene oxide polymer have been observed in amounts greater than about 1 weight per cent, based on weight of zinc.

The cells in which the ethylene oxide polymer is employed can be of conventional construction. For instance, a suitable cell includes a cupped metallic can, suitably constructed of steel or other metal which may be nickel plated in whole or in part, that is surrounded by an insulating jacket. The extremities of the jacket are crimped around the outer edges of a top metal cover (the negative terminal of the battery) and the outer edges of a bottom metal cover, the positive terminal. An insulator insulates the can from the top metal cover. Snuggly fitting within the can is a tubular cathode containing particulate manganese dioxide and carbon, and lined on the inner surface thereof with a separator suitably made of a non-woven cellulosic fabric.

Enclosed within the separator is a semi-rigid tubular anode formed by extruding a mixture of powdered zinc, aqueous potassium hydroxide electrolyte, and an electrolyte-swellable binder such as carboxymethyl cellulose. The anode is held firmly in place as a result of its own expansion occasioned by its absorbing alkaline electrolyte. A hollow, tubular brass current collector extends all the way through the anode electrolyte gel and is electrically connected to the top metal cover of the can by a suitable metal connector such as a brass rivet having a nickel plated tip in contact with a nickel-plated steel spring which makes contact with the top metal cover.

Other types of zinc alkaline cell construction can be used also, including those wherein the anode is massive zinc, pressed powdered zinc, or zinc plated on another metal, as well as those wherein the zinc is in powdered form distributed throughout an electrolyte gel.

The electrolyte employed in the cells is aqueous alkali, particularly potassium hydroxide.

The mercury can be added to the cell by the procedure described in U.S. Pat. No. 2,993,947. In commercial practice today, the proportion of mercury employed in alkaline zinc-manganese dioxide cells to achieve any given level of storage stability will vary depending on factors such as cell construction, raw material purities, degree of seal effectiveness, and the like. For instance, the proportion of mercury in commercial alkaline zinc-manganese dioxide cells has varied from about 1 to about 15 weight per cent, based on weight of zinc. By practicing the present invention, the amount of mercury needed to achieve any given level of storage stability can be significantly reduced by the addition of ethylene oxide polymer, as taught herein.

The Examples below illustrate the practice of the invention.

EXAMPLE 1

In order to compare the performance of cells made in accordance with the invention with the performance of conventional cells, three groups of "D" size cells were made. One group, Lot A, is constructed in conventional fashion employing an anode construction in the manner of U.S. Pat. No. 2,993,947, employing 6.3 weight per cent mercury (based on weight of zinc). Lot B is constructed in the same manner using 4.0 per cent mercury. Lot C is constructed in the same manner except that ethylene oxide polymer has been added to the anode material, according to the following formulation:

| | |
|---|---|
| Zinc powder | 78.19 lb. |
| Metallic mercury | 3.12 |
| Sodium carboxymethyl cellulose | 5.31 |
| 0.1 N KOH soln. | 2.30 |
| 215 ml of ethylene oxide polymer "MPEG 550" [2] dissolved in 9.30 lb. of 0.1 N KOH soln. | 9.77 |

[2] methoxy polyethylene glycol having an average molecular weight of from 525 to 575.

It is necessary to add the final solution in the last step; if the solution is added before the metallic mercury, the ethylene oxide polymer coats the zinc particles and does not permit amalgamation.

The efficacy of the ethylene oxide polymer is demonstrated by manufacturing cells and storing them at 71° C. to induce rapid generation of gas. Since the cells are sealed, the internal gas accumulation causes the bottom of the container to bulge measurably. The cans are drawn from .010 inch thick steel, and the can bottom can be calibrated to measure internal pressure as a function of bulge. This function has been determined to be 4 psi/mil of bulge within the accuracy required. Consequently the conventional battery of Lot A has built up to an internal pressure of 120 psi after ten weeks at 71° C. When the mercury level is reduced in Lot B, the gassing rate increases substantially to reach an internal pressure of 176 psi. But when the ethylene oxide polymer is added in Lot C, the gassing rate returns to normal and 120 psi internal pressure results. Table I, below, displays the results of this evaluation.

Table I

| Lot | Description | Bulge Increase after 10 weeks at 71°C., mils |
|---|---|---|
| A | 6.3 percent mercury control, no ethylene oxide polymer | 30 |
| B | 4.0 percent Mercury, no ethylene oxide polymer | 44 |
| C | 4.0 percent Mercury with 0.66 weight percent MPEG 550, based on weight of zinc in anode. | 30 |

EXAMPLE 2

As a further demonstration MPEG 550 was added to the cell in a different way. One group, Lot D, is of conventional construction with 4.2 per cent mercury by weight of zinc. Another group of the same construction, Lot E, also contained 4.2 per cent mercury. However, instead of adding MPEG 550 directly to the zinc powder mixture as in Example 1, the MPEG 550 was dissolved in water and sprayed onto the separator. A solution of 9 parts MPEG 550 by volume to 256 parts water by volume was prepared, and 2.65 grams of this solution was sprayed onto the separator of a "D" size cell. The cell was then assembled in the conventional manner, the anode containing 4.2 per cent mercury. After storage at 71° C. for 7 weeks, Lot E displayed a lower bulge and, consequently, lower internal pressure, showing that the gassing rate was lower.

Table II

| Lot | Description | Bulge Increase after 7 weeks at 71° C., mils |
|---|---|---|
| D | 4.2 percent Mercury | 24 |
| E | 4.2 percent Merc with MPEG 550 soln. on separator | 17 |

EXAMPLE 3

In some cases, the addition of ethylene oxide polymer to alkaline zinc-manganese cells causes an initial small drop in cell voltage, although the voltage is maintained slightly better on a constant resistance drain. The result is that the ampere-hours service output for such cells is about the same (on a constant resistance drain), both with and without the ethylene oxide polymer. To illustrate, four "D"-size cells of the same construction given in Example 1 were evaluated. Table III, below, describes the cells, and Table IV displays the times that each cell took for the voltages to drop to several specific voltages, on a continuous 2.25 ohm drain.

Table III

| Cell No. | Weight Percent Hg - Based on Weight of Zinc | Weight Percent MPEG 550 - Based on Weight of Zinc | How MPEG Added |
|---|---|---|---|
| 1 | 8 | — | — |
| 2 | 4 | — | — |
| 3 | 4 | 0.7 | Added to separator |
| 4 | 4 | 0.7 | Added to anode gel |
| 5 | 4 | 0.35 | Added to separator |

Table IV

| Cell Lot No. | Initial Closed Circuit Voltage | Time, in minutes, to the indicated Voltage on 2.25 ohm continuous drain | | | |
|---|---|---|---|---|---|
| | | 1.2 V | 1.0 V | 0.9 V | 0.65 V |
| 1 | 1.41 | 120 | 512 | 655 | 889 |
| 2 | 1.42 | 150 | 583 | 742 | 834 |
| 3 | 1.41 | 115 | 565 | 770 | 912 |
| 4 | 1.31 | 50 | 497 | 753 | 1082 |
| 5 | 1.39 | 100 | 483 | 625 | 958 |

The foregoing lots of cells were evaluated for storage stability, as measured by bottom bulge. After 24 months at room temperature, the cells of Lot 1 had a 19 mil bottom bulge, whereas the cells from Lots 2 – 5 had bottom bulges of from 23 to 26 mils, the differences between them being considered to be too small to be significant. At elevated temperatures, however, significant differences exist in the storage stabilities of cells from Lots 2 – 5. Tables V and VI display the bottom bulges for the several cells after varying lengths of time at 54° C. and 71° C., respectively.

Table V

Storage at 54° C.

| Cell Lot No. | Increase in Bottom Bulge, in mils, after the indicated time in storage | | |
|---|---|---|---|
| | 2 Months | 3 Months | 4.5 Months |
| 1 | 3 | 3 | 4 |
| 2 | 16 | 18 | 20 |
| 3 | 12 | 19 | 17 |
| 4 | 7 | 8 | 9 |
| 5 | 9 | 11 | 11 |

Table VI

Storage at 71° C.

| Cell Lot No. | Increase in Bottom Bulge, in mils, after the indicated storage time in weeks. | | | | | | |
|---|---|---|---|---|---|---|---|
| | 1 | 2 | 3 | 4 | 5 | 6 | 7 |
| 1 | (Didn't run this lot at 71° C.) | | | | | | |
| 2 | 12 | 17 | 19 | 20 | 21 | 22 | 24 |
| 3 | 8 | 10 | 11 | 13 | 13 | 16 | 17 |
| 4 | 4 | 6 | 7 | 7 | 7 | 8 | 8 |
| 5 | 6 | 11 | 12 | 15 | 15 | 16 | 18 |

EXAMPLE 4

The following ethylene oxide polymers have been evaluated by procedures analogous to those described above, and have been found to confer improved storage stability on alkaline zinc-manganese dioxide cells as evidenced by reduction in evolution of hydrogen gas on storage.

Polyethylene glycols having the following average molecular weights:

a) 190 – 210
b) 380 – 420
c) 950 – 1050
d) 3000 – 3700
e) 1300 – 1600

What is claimed is:

1. A galvanic cell having a zinc anode, a manganese dioxide cathode and an alkaline electrolyte, said zinc anode containing less than 8 percent mercury based on the weight of the zinc anode, said cell also containing an ethylene oxide polymer selected from the group consisting of diethylene glycol, triethylene glycol, polyethylene glycol having an average molecular weight of from about 190 to about 7,000, $C_4$ and lower alkyl ethers thereof and $C_4$ and lower alkanoate esters thereof, said ethylene oxide polymer and said mercury in combination providing an improved storage stability under comparable conditions for said cell as provided by a cell otherwise identical but containing the same quantity of mercury in the absence of said ethylene oxide polymer.

2. the cell of claim 1 wherein the alkaline electrolyte is aqueous potassium hydroxide.

3. The cell of claim 2 wherein the ethylene oxide polymer is present in the cell in an amount greater than about 0.01 weight per cent, based on weight of said zinc.

4. The cell of claim 2 wherein the ethylene oxide polymer is present in the cell in an amount greater than about 0.1 weight per cent, based on weight of said zinc.

5. The cell of claim 3 wherein the ethylene oxide polymer is present in an amount of from about 0.01 to about 1 weight per cent based on weight of said zinc.

6. The cell of claim 4 wherein the ethylene oxide polymer is present in an amount of from about 0.1 to about 1 weight per cent, based on weight of said zinc.

7. The cell of claim 2 wherein the ethylene oxide polymer is polyethylene glycol or methoxy polyethylene glycol having an average molecular weight of from about 300 to about 700.

* * * * *